May 2, 1961 D. J. VEAL 2,982,796
PURIFICATION OF HYDROCARBONS
Filed June 9, 1958 2 Sheets-Sheet 1

INVENTOR.
D. J. VEAL
BY Hudson and Young
ATTORNEYS

United States Patent Office 2,982,796
Patented May 2, 1961

2,982,796

PURIFICATION OF HYDROCARBONS

Dean J. Veal, Bartlesville, Okla., assignor to Phillips Petroleum Company, a corporation of Delaware Filed June 9, 1958, Ser. No. 740,716

6 Claims. (Cl. 260—681.5)

This invention relates to a process for the purification of hydrocarbons and, specifically, to a process for removing hydrocarbons containing an active methylene group from mixtures containing the same.

Many methods are available for the purification of hydrocarbons, some of these being of greater efficiency than others. Recent work on polymerization has shown that monomer purity may be very important in inhibiting polymerization and in the preparation of specific types of polymers, such as polymers with a particular orientation of the monomer groups in the polymer. A specific example of such polymerization is the production of polyisoprene with organometallic catalysts. Such catalyst systems appear to be highly sensitive to various impurities when compared to emulsion polymerization systems. Extreme monomer purity is not always necessary but, for good yields of the proper product, some impurities can exert a great influence on the polymerization even when they are present in small amounts.

The presence of cyclopentadiene is such an impurity when the polymerization of isoprene is carried out. Based upon the amount of isoprene polymerized, and with a particular polymerization system, 0.007 weight percent cyclopentadiene results in a 10 percent decrease in polymerization. Doubling the amount of cyclopentadiene reduces conversion by 25 percent.

Thus it is apparent that isoprene used for such polymerization must contain an extremely small amount of cycopentadiene. This invention provides a method for the required purification. The cyclopentadiene contains an active methylene group and this group can be defined as a methylene group bonded by single valence bonds to two carbon atoms, each of said two carbon atoms being in turn bonded by double bonds to an additional carbon atom, each of said additional carbon atoms being bonded to each other by a single valence bond.

The following are objects of my invention.

An object of my invention is to provide a new process for purifying hydrocarbons. A further object of my invention is to provide a process for removing compounds containing an active methylene group from hydrocarbon mixtures containing the same. A further object of my invention is to provide a process for preparing isoprene substantially free of cyclopentadiene.

Other objects and advantages of my invention will be apparent to one skilled in the art upon reading this disclosure, accompanying and forming a part of same is a drawing comprising—

Figure 1:
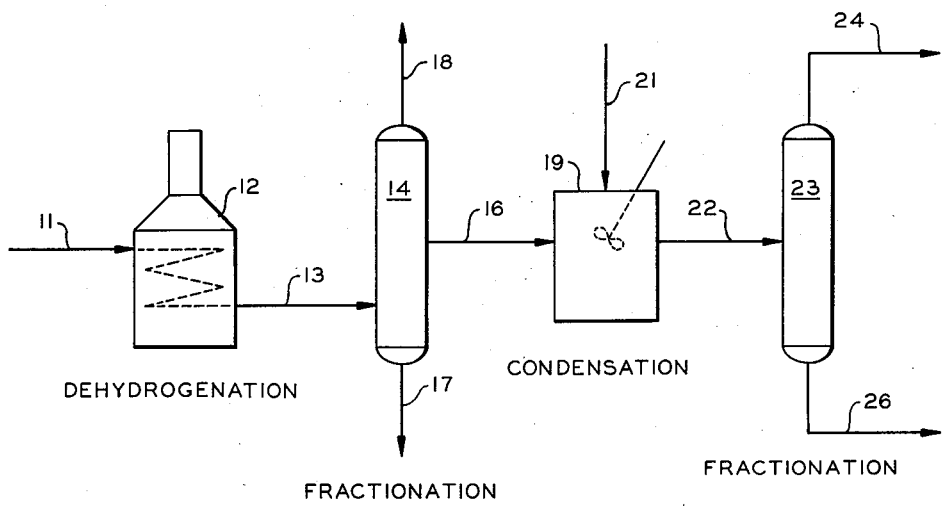
Figure 2:
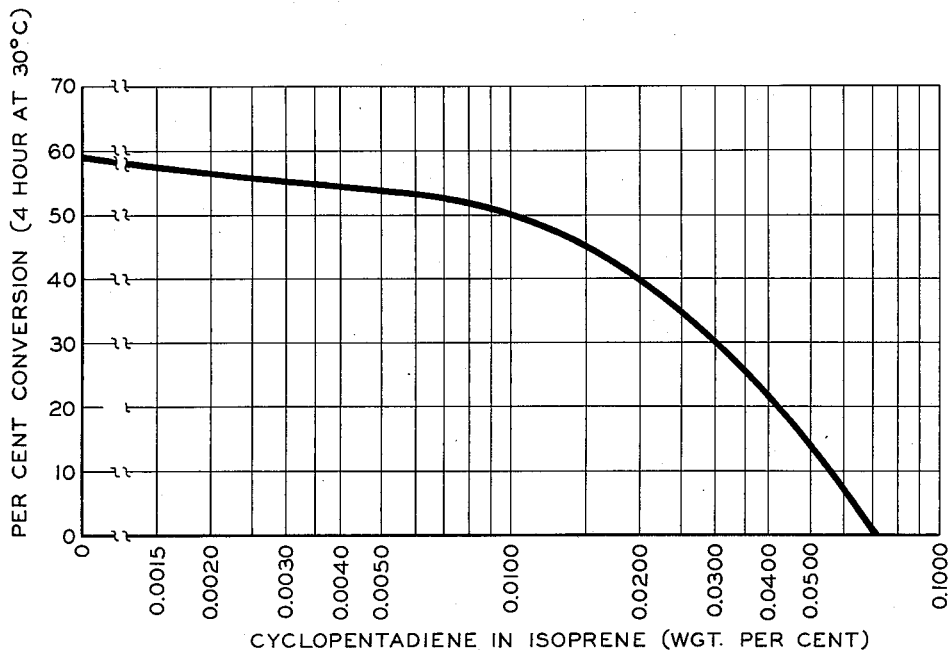
Figure 3:
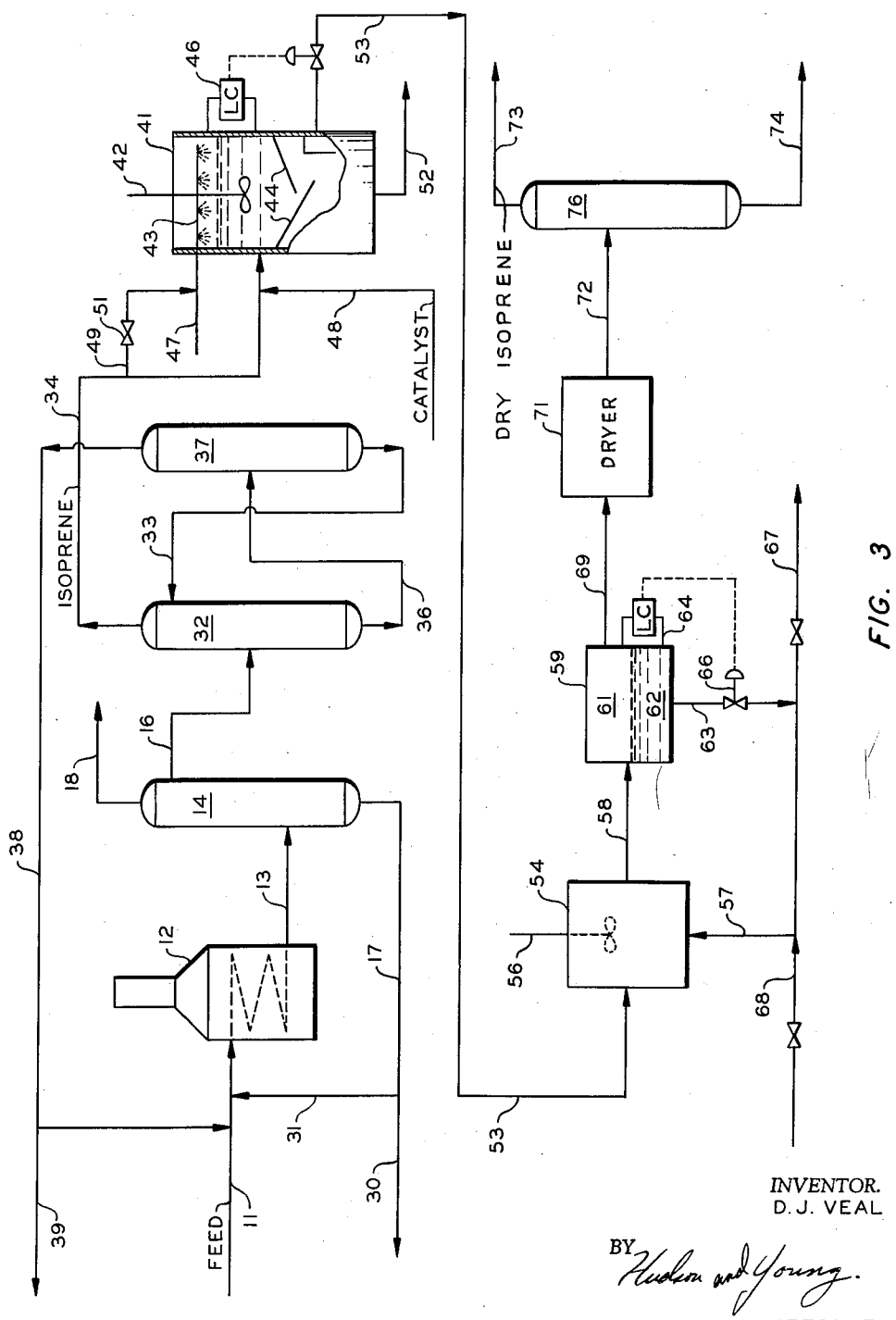

Figure 1, a flow diagram of a simplified form of my invention;

Figure 2, comprising a curve showing the effect of cyclopentadiene upon the polymerization of isoprene; and Figure 3, comprising a flow sheet of a process for carrying out my invention.

Broadly, the invention resides in a process of treating a mixture of hydrocarbons to remove a compound containing an active methylene group, as defined above, comprising contacting the mixture of hydrocarbons in the presence of a basic catalyst with a molar excess of treating agent selected from the group consisting of aldehydes and ketones to convert said compound containing the active methylene group to the corresponding fulvene, and separating said fulvene from the hydrocarbon mixture.

More specifically, the invention is the process of removing cyclopentadiene from isoprene contaminated therewith comprising contacting the contaminated isoprene in the presence of sodium ethylate with benzaldehyde to convert said cyclopentadiene to phenylfulvene, said benzaldehyde being present in a molar excess with respect to said cyclopentadiene, and separating said phenylfulvene from said isoprene.

In a specific embodiment, the invention resides in the production of isoprene substantially free of cyclopentadiene, the steps comprising dehydrogenating isopentane in a dehydrogenation zone; fractionating the dehydrogenation zone effluent to provide an isoprene-enriched center cut, said center cut being contaminated with cyclopentadiene; extracting said center cut with dimethylformamide to provide a raffinate of reduced acetylene, butene and pentene content; contacting said raffinate with benzaldehyde in the presence of sodium ethylate in a contacting zone, the amount of said benzaldehyde being in molar excess with respect to cyclopentadiene in said raffinate, said benzaldehyde reacting with said cyclopentadiene thereby producing phenylfulvene; treating the effluent from said contacting zone with aqueous sodium bisulfite to remove excess benzaldehyde and sodium ethylate; recovering a hydrocarbon stream free of sodium bisulfite, benzaldehyde, and sodium ethylate; drying said last recovered stream and fractionating same to provide an overhead isoprene stream substantially free of cyclopentadiene and a bottoms containing substantially all of said phenylfulvene.

For a further understanding of this invention, attention is directed to Figure 1 of the drawing. This figure illustrates the production of isoprene from isopentane by cracking the isopentane and recovering an isoprene-containing fraction. In this process, isopentane is supplied by conduit 11 to furnace 12 where it is dehydrogenated by conventional operation to produce an isoprene-containing stream, such a stream containing, roughly, 15 percent isoprene. By conduit 13 this stream is introduced into fractionator 14 and a center cut containing about 80 percent isoprene is obtained in conduit 16, most of the higher boiling materials being removed as a kettle product and conduit 17 and lighter materials being removed overhead by conduit 18. This isoprene stream is introduced into condensation or mixing zone 19 and an aldehyde or ketone is supplied by means of conduit 21. Also supplied by conduit 21 is a catalytic amount of a base. When an aldehyde, or ketone, is contacted with cyclopentadiene in the presence of a basic catalyst, the corresponding fulvene is formed, this fulvene being higher boiling than the cyclopentadiene. The effluent from condensation zone 19 is passed by conduit 22 to fractionation zone 23 wherein the cyclopentadiene is removed overhead by conduit 24 and the high boiling fulvene remains in the kettle product which is removed by conduit 26.

Figure 3 illustrates a specific modification of the process showing the fundamental components of a plant for the production of isoprene from isopentane. This figure will be described as it relates to the use of a specific aldehyde and includes certain treatment steps not shown in Figure 1. In Figure 3 the feed is supplied by conduit 11 to dehydrogenation furnace 12. Also fed to this stream are certain recycle streams to be more fully described hereinafter. When commercial isopentane is dehydrogenated over an alumina-chromia catalyst in a furnace such as 12, the effluent, obtained in conduit 13, has a composition such as that given in Table I.

TABLE I

| Component: | Vol. percent |
|---|---|
| $C_2$-$C_4$ | .87 |
| 3-me-1-butene | 1.65 |
| Isopentane | 59.77 |
| 2-pentene | 3.5 |
| 2-me-1-butene | 6.70 |
| Isoprene | 14.10 |
| n-Pentane | .40 |
| 2-me-2-butene | 11.40 |
| Cyclopentadiene | .14 |
| Piperylenes | 1.45 |
| Acetylenes | .02 |
| | 100.00 |

This effluent, the material of the composition of Table I, is then passed to fractionator 14 wherein a heart or center cut suitable for purification is obtained, this stream obtained in conduit 16 having a composition such as that set forth in Table II.

TABLE II

| Component: | Volume percent |
|---|---|
| 2-me-1-butene | 7.30 |
| Isoprene | 81.61 |
| n-Pentane | 2.23 |
| 2-pentenes | 1.28 |
| 2-me-2-butene | 7.43 |
| Cyclopentadiene | 0.13 |
| Acetylenes | 0.02 |

While this composition would normally be considered quite pure as far as cyclopentadiene is concerned, polymerization data show that it cannot be satisfactorily used with certain organometal catalysts because of the cyclopentadiene present.

Also obtained from fractionator 14 are the light ends which are removed by conduit 18 and the kettle product which is removed by conduit 17, this latter stream being suitable for recycle to the furnace by conduit 31, if desired, or removed from the system through conduit 30.

The purity of the material recovered in conduit 16 can be improved and the butenes and pentenes therein can be substantially recovered for recycle to the dehydrogenation operation by extractive distillation and I have shown such an operation in Figure 3. For this operation a polar solvent such as butyrolactone, diethylene glycol, triethylene glycol, polyethylene glycol, dimethylformamide, and many others, are quite suitable as the selective solvent. Dimethylformamide is preferred and is referred to in the subsequent discussion. The material in conduit 16 is, for this method, supplied to extraction column 32 wherein it is contacted with dimethylformamide supplied by conduit 33, this solvent removing acetylene and most of the butanes and pentenes to produce a raffinate taken overhead by conduit 34. The material in conduit 34 has the typical composition of Table III.

TABLE III

| Component: | Volume percent |
|---|---|
| 2-me-1-butene | 0.86 |
| Isoprene | 94.87 |
| n-Pentane | 2.59 |
| 2-pentenes | 0.19 |
| 2-me-2-butane | 1.34 |
| Cyclopentadiene | .15 |

The bottoms or extract phase from column 32 is transferred by means of conduit 36 to solvent stripper 37, wherein the hydrocarbon is stripped from the solvent and taken overhead by means of conduit 38 for recycle to dehydrogenation zone 12. The material can be removed from the system by means of conduit 39 if desired.

The material in conduit 34 is then supplied to mixer 41, this mixer being provided with an agitator 42, spray inlet means 43, baffle means 44 and liquid level controller 46. Supplied to the spray means is benzaldehyde, this being supplied by conduit 47. Also supplied is a catalyst comprising sodium ethylate, this being introduced by conduit 48. In a preferred modification, a portion of the stream in conduit 34 is mixed with the benzaldehyde prior to introduction into mixer 41, this portion being added to conduit 47 by means of conduit 49 containing valve 51 therein.

In one specific operation, the process is adjusted so that approximately 110 gallons per hour of material having the composition shown in Table III is passed through line 34 wherein a concentrated sodium hydroxide in ethanol solution is injected by means of conduit 48 at a rate of 1.75 gallons per hour. Benzaldehyde is supplied by conduit 47 at a rate of 1.7 gallons per hour. In this preferred modification, 8.25 gallons of the material of conduit 34 is bypassed through conduit 49 and mixed with the benzaldehyde prior to its introduction into mixing zone 41.

Within vessel 41 a reaction between the cyclopentadiene and the benzaldehyde results in the formation of phenylfulvene which, being heavier, separates and settles out in the bottom portion of mixer 41. This phenylfulvene is removed for recovery, purification, or disposal by means of conduit 52. The hydrocarbon phase, containing some unreacted benzaldehyde and some sodium ethylate, is removed from the upper portion of the space below baffles 44 by means of conduit 53, flow through this conduit being controlled by liquid level controller 46. Conduit 53 extends to mixer 54 provided with agitation means 56 wherein the mixture is treated with aqueous sodium bisulfite supplied by means of conduit 57. The mixed phase formed in mixer 54 is passed by conduit 58 to settler 59 wherein two phases, a hydrocarbon phase 61 and an aqueous phase 62, separate. The aqueous phase is removed by conduit 63, this removal being controlled by interphase controller 64 connected to valve 66. A portion of the material removed in conduit 63 is continuously removed by conduit 67 and the remainder is recycled to mixer 54. Fresh aqueous sodium bisulfite is supplied by conduit 68. The hydrocarbon phase from settler 59 is passed by means of conduit 69 to drier 71. Drier 71 can be a propane fractionator or can contain a solid absorbent such as bauxite, silica, alumina, etc. The particular type of drying is not important. The dried isoprene fraction is passed by conduit 72 to fractionator 76 wherein the isoprene is distilled overhead through conduit 73 and the kettle product is removed by conduit 74. In this process, approximately 100 gallons per hour of purified isoprene can be prepared having an isoprene content above 95 percent. A typical analysis for this product is set forth in Table IV.

TABLE IV

| Component: | Volume percent |
|---|---|
| 2-me-1-butene | 0.7 |
| Isoprene | 95.4 |
| n-Pentane | 2.5 |
| 2-pentenes | .2 |
| 2-me-2-butane | 1.2 |
| Cyclopentadiene | Trace (0.0010 to 0.0045) |

Figure 2 illustrates the necessity for a process such as that disclosed in this application.

Comparatively small amounts of cyclopentadiene have a very deleterious effect upon the polymerization of isoprene. While the exact drop off point will depend upon the catalyst system employed, the general shape of the curve is present in any system.

The curve of Figure 2 was based upon a series of polymerization runs containing varying amounts of cyclopentadiene and employing the following polymerization recipe:

Recipe

| | Parts |
|---|---|
| Isoprene | 100 |
| Toluene | 650 |
| Triisobutylaluminum | 1.19 |
| Titanium tetrachloride | 1.27 |
| Cyclopentadiene | Variable |

With no cyclopentadiene, approximately 60 percent conversion is obtained at 30° C. With this recipe, polymerization is entirely inhibited if the feed contains over 0.07 weight percent cyclopentadiene. Thus the composition set forth in Table II above appears to be a polymerizable mixture. No polymer is formed using the catalyst system set forth above. All of the polymerization data are based upon 4-hour runs at 30° C.

For convenience, specific embodiments of the invention have been described and considerable emphasis has been placed upon the purification of isoprene contaminated with cyclopentadiene. However, as pointed out in the early portion of this disclosure, the invention is applicable to the removal of compounds containing the active methylene group as defined above. It is, of course, applicable to substituted cyclopentadienes containing one or more substituents in the 1, 2, 3, or 4 positions. Such materials include, for example, 1-methylcyclopentadiene; 2-isopropyl - 4 - methylcyclopentadiene; 1,2,3,4 - tetraethylcyclopentadiene; 1-butyl-3-cyclohexylcyclopentadiene; 1-ethyl - 2,3 - dimethyl-4-n-propylcyclopentadiene; and the like. It is also applicable to aromatic substituted cyclopentadiene such as indene and fluorene and such compounds containing hydrocarbon substituents on the 6-membered ring such as those set forth above with respect to the substituted cyclopentadiene. Cyclopentadiene, as used in this disclosure, means the conjugated 1,3-cyclopentadiene.

Benzaldehyde was used as the material used to produce the fulvene in the example but many other aldehydes and ketones are suitable, although the higher molecular weight ones are preferred. Substituents such as nitro, chloro, iodo, amino, hydroxyl, etc. groups can be present. Fulvenes prepared from low molecular weight materials such as acetone are somewhat unstable as compared to those prepared from higher molecular weight materials such as benzaldehyde. Other suitable treating agents include methyl ethyl ketone, benzophenone, anisaldehyde, para-nitrobenzaldehyde, para-aminobenzaldehyde, para-dimethylamino-benzaldehyde, cinnamic aldehyde, acetophenone, cyclopentanone, salicylaldehyde, citronellal, vanillan, diphenyl ketone, ethyl octyl ketone, isoamyl phenyl ketone. Subsequent treatment and recovery of the material containing the active methylene group is simplified if the aldehyde or ketone is a material which has a higher boiling point than does the material containing the active methylene group. Therefore, in a preferred aspect, the aldehyde or ketone should be such a higher boiling material.

For substantially complete removal of the material containing the active methylene group, the ketone or aldehyde should be used in a molar excess with respect to the hydrocarbon. A 10-fold excess was used in the example in connection with Figure 3 and the range of 2 to 20 times that stoichiometrically equivalent to the hydrocarbon is generally used. The production of the fulvene progresses at a very slow rate in the absence of a basic catalyst and therefore a basic catalyst is preferably used. The most common ones are alkali metal alcoholates, such as sodium ethylate and potassium methylate, but other basic catalysts are also suitable. The amount of catalyst can vary widely, depending upon the complete system, but I prefer to use 0.5 to 5 mols of the catalyst per mol of the aldehyde or ketone.

Subsequent to the production of the fulvene it is necessary to remove, in addition to the fulvene, any excess aldehyde or ketone and the basic catalyst. As shown above, this is conveniently done by treating the mixture with an aqueous solution of sodium bisulfite or potassium bisulfite or other material which will convert the aldehyde or ketone to a water-soluble product. The sodium ethylate or other basic catalyst also dissolves in the water and this provides a method for removing this material from the hydrocarbon phase.

As set forth, this invention provides a removal for material containing an active methylene group from admixture with other hydrocarbons. The specific example is directed to the removal of cyclopentadiene from isoprene. In this connection, certain polymerization data are presented and it is shown that cyclopentadiene will inhibit the polymerization of isoprene to a great extent. This is not to be taken to mean that other materials will not also inhibit this polymerization and that other purification steps may not be necessary in the production of isoprene suitable for this polymerization. The invention has been set forth with respect to the removal of a particular polymerization inhibitor and the invention can be used in connection with other purification systems to prepare isoprene of suitable purity.

As many possible embodiments can be made of this invention without departing from the scope thereof, it is to be understood that all matter herein set forth is to be interpreted as illustrative and not as unduly limiting the invention.

I claim:

1. A process of treating a mixture of hydrocarbons to remove a compound containing an active methylene group, an active methylene group being defined as a methylene group bonded by single valence bonds to two carbon atoms, each of said two carbon atoms being in turn bonded by double bonds to an additional carbon atom, each of said additional carbon atoms being bonded to each other by a single valence bond comprising contacting the mixture of hydrocarbons in the presence of an alkali metal alcoholate with a treating agent selected from the group consisting of acetone, benzaldehyde, methyl ethyl ketone, benzophenone, anisaldehyde, para-nitrobenzaldehyde, para-aminobenzaldehyde, para-dimethylaminobenzaldehyde, cinnamic aldehyde, acetophenone, cyclopentanone, salicyaldehyde, citronellal, vanillan, diphenyl ketone, ethyl octyl ketone and isoamyl phenyl ketone to convert said compound containing said active methylene group to the corresponding fulvene, said treating agent being present in a molar excess with respect to said compound containing said active methylene group, adding aqueous alkali metal bisulfite to remove excess alkali metal alcoholate and treating agent, separating resulting hydrocarbon and aqueous phases, and separating said fulvene from the hydrocarbon thereby obtaining a hydrocarbon fraction free of said compound containing an active methylene group.

2. The process of removing cyclopentadiene from isoprene contaminated therewith comprising contacting the contaminated isoprene in the presence of an alkali metal alcoholate with a treating agent selected from the group consisting of acetone, benzaldehyde, methyl ethyl ketone, benzophenone, anisaldehyde, para-nitrobenzaldehyde, para-aminobenzaldehyde, para-dimethylaminobenzaldehyde, cinnamic aldehyde, acetophenone, cyclopentanone, salicylaldehyde, citronellal, vanillan, diphenyl ketone, ethyl octyl ketone and isoamyl phenyl ketone to convert said cyclopentadiene to the corresponding fulvene, said treating agent being present in a molar excess with respect to said cyclopentadiene, adding aqueous alkali metal bisulfite to remove excess alkali metal alcoholate and treating agent, separating a hydrocarbon phase containing said fulvene and said isoprene from the aqueous phase, and separating said fulvene from said isoprene.

3. The process of removing cyclopentadiene from isoprene contaminated therewith comprising contacting the contaminated isoprene in the presence of an alkali metal alcoholate with benzaldehyde to convert said cyclopentadiene to the corresponding fulvene, said benzaldehyde being present in a molar excess with respect to said cyclopentadiene, adding aqueous alkali metal bisulfite to remove excess alkali metal alcoholate and benzaldehyde, separating a hydrocarbon phase containing said fulvene and said isoprene from the aqueous phase, and separating said phenylfulvene from said isoprene.

4. The process of removing cyclopentadiene from isoprene contaminated therewith comprising contacting the contaminated isoprene in the presence of sodium ethylate with benzaldehyde to convert said cyclopentadiene to phenylfulvene, said benzaldehyde being present in a molar excess with respect to said cyclopentadiene, adding aqueous sodium bisulfite to remove excess sodium ethylate and benzaldehyde, separating a hydrocarbon phase containing said phenylfulvene and said isoprene from the aqueous phase, and separating said phenylfulvene from said isoprene.

5. In the production of isoprene substantially free of cyclopentadiene, the steps comprising dehydrogenating isopentane in a dehydrogenation zone, fractionating the dehydrogenation zone effluent to provide an isoprene enriched center cut, said center cut being contaminated with cyclopentadiene; contacting said center cut with benzaldehyde in the presence of sodium ethylate in a contacting zone, the amount of said benzaldehyde being in molar excess with respect to cyclopentadiene in said center cut, said benzaldehyde reacting with said cyclopentadiene thereby producing phenylfulvene; treating the effluent from said contacting zone with aqueous sodium bisulfite to remove excess benzaldehyde and sodium ethylate; recovering a hydrocarbon stream free of sodium bisulfite, benzaldehyde, and sodium ethylate; fractionating said last recovered stream to provide an overhead isoprenee stream substantially free of cyclopentadiene and a bottoms containing substantially all of said phenylfulvene.

6. In the production of isoprene substantially free of cyclopentadiene, the steps comprising dehydrogenating isopentane in a dehydrogenation zone; fractionating the dehydrogenation zone effluent to provide an isoprene-enriched center cut, said center cut being contaminated with cyclopentadiene; extracting said center cut with dimethylformamide to provide a raffinate of reduced acetylene, butene and pentane content; contacting said raffinate with benzaldehyde in the presence of sodium ethylate in a contacting zone, the amount of said benzaldehyde being in molar excess with respect to cyclopentadiene in said raffinate, said benzaldehyde reacting with said cyclopentadiene thereby producing phenylfulvene; treating the effluent from said contacting zone with aqueous sodium bisulfite to remove excess benzaldehyde and sodium ethylate; recovering a hydrocarbon stream free of sodium bisulfite, benzaldehyde, and sodium ethylate; drying said last recovered stream and fractionating same to provide an overhead isoprene stream substantially free of cyclopentadiene and a bottoms containing substantially all of said phenylfulvene.

References Cited in the file of this patent

UNITED STATES PATENTS

| | | |
|---|---|---|
| 2,376,426 | Frey | May 22, 1945 |
| 2,398,973 | Soday | Apr. 23, 1946 |
| 2,589,969 | Schultze et al. | Mar. 18, 1952 |
| 2,704,778 | Maisel | Mar. 22, 1955 |
| 2,851,505 | Henke et al. | Sept. 9, 1958 |

OTHER REFERENCES

Wilson et al.: Chemical Reviews, volume 34, 1944, pages 32–34. "Faraday's Encyclopedia of Hydrocarbon Compounds" published by Chemindex Ltd., 1958, volume $C_8$ at page 08022.00.11.